United States Patent
Malvern

(10) Patent No.: US 10,209,270 B2
(45) Date of Patent: Feb. 19, 2019

(54) INERTIAL SENSORS

(71) Applicant: Atlantic Inertial Systems, Limited, Plymouth, Devon (GB)

(72) Inventor: Alan Richard Malvern, Plymouth (GB)

(73) Assignee: ATLANTIC INERTIAL SYSTEMS, LIMITED, Devon (GB)

( * ) Notice: Subject to any disclaimer, the term of this patent is extended or adjusted under 35 U.S.C. 154(b) by 49 days.

(21) Appl. No.: 15/425,024

(22) Filed: Feb. 6, 2017

(65) Prior Publication Data

US 2017/0227572 A1 Aug. 10, 2017

(30) Foreign Application Priority Data

Feb. 9, 2016 (GB) .................................. 1602331.9

(51) Int. Cl.
*G01C 19/56* (2012.01)
*G01C 19/5776* (2012.01)
(Continued)

(52) U.S. Cl.
CPC .......... *G01P 15/18* (2013.01); *G01C 19/5677* (2013.01); *G01C 19/5684* (2013.01);
(Continued)

(58) Field of Classification Search
CPC ........................ G01C 19/5677; G01C 19/5684
See application file for complete search history.

(56) References Cited

U.S. PATENT DOCUMENTS 5,095,750 A 3/1992 Suzuki et al.
5,226,321 A 7/1993 Varnham et al.
(Continued)

FOREIGN PATENT DOCUMENTS

EP 0565384 A1 10/1993
EP 0729010 A1 8/1996
(Continued)

OTHER PUBLICATIONS

GB Search Report for Application No. GB1602331.9, dated Jul. 11, 2016, 4 Pages.
(Continued)

*Primary Examiner* — Lisa Caputo
*Assistant Examiner* — Herbert K Roberts
(74) *Attorney, Agent, or Firm* — Cantor Colburn LLP

(57) ABSTRACT

An inertial sensor includes a substantially planar, rotationally symmetric proof mass, a capacitive pick-off circuit connected to the proof mass, an electrical drive circuit connected to the four pairs of electrodes. The drive circuit is arranged to apply first in-phase and anti-phase pulse width modulation (PWM) drive signals with a first frequency to the first and third electrode pairs, such that one electrode in each pair is provided with in-phase PWM drive signals and the other electrode in each pair is provided with anti-phase PWM drive signals and to apply second in-phase and anti-phase PWM drive signals with a second frequency, different to the first frequency, to the second and fourth electrode pairs, such that one electrode in each pair is provided with in-phase PWM drive signals and the other electrode in each pair is provided with anti-phase PWM drive signals.

15 Claims, 10 Drawing Sheets

(51) Int. Cl.
*G01P 15/18* (2013.01)
*G01C 19/5677* (2012.01)
*G01C 19/5762* (2012.01)
*G01P 15/125* (2006.01)
*G01C 19/5684* (2012.01)
*G01P 15/097* (2006.01)
*G01P 15/08* (2006.01)

(52) U.S. Cl.
CPC ........ *G01C 19/5762* (2013.01); *G01P 15/097* (2013.01); *G01P 15/125* (2013.01); *G01P 2015/0865* (2013.01)

(56) References Cited

U.S. PATENT DOCUMENTS

| | | | |
|---|---|---|---|
| 5,817,940 A * | 10/1998 | Kobayashi | G01C 19/5677 73/504.12 |
| 6,189,382 B1 * | 2/2001 | Johnson | G01C 19/5691 73/504.13 |
| 6,553,833 B1 * | 4/2003 | Funk | G01C 19/5712 73/504.08 |
| 6,651,499 B2 | 11/2003 | Fell et al. | |
| 6,718,823 B2 | 4/2004 | Platt | |
| 7,267,006 B2 | 9/2007 | Malvern | |
| 8,549,918 B2 | 10/2013 | Kuang et al. | |
| 8,997,564 B2 | 4/2015 | Nasiri et al. | |
| 2004/0221651 A1 * | 11/2004 | Schiller | G01C 19/56 73/514.34 |
| 2007/0177316 A1 * | 8/2007 | Hotelling | G01C 19/5705 361/51 |
| 2009/0064782 A1 * | 3/2009 | Yazdi | G01C 19/5677 73/504.13 |
| 2013/0197858 A1 * | 8/2013 | Egretzberger | G01C 19/56 702/145 |
| 2014/0260611 A1 * | 9/2014 | Johari-Galle | G01C 19/5677 73/504.12 |
| 2014/0331740 A1 * | 11/2014 | Okon | G01C 19/5776 73/1.77 |
| 2015/0128701 A1 * | 5/2015 | Vohra | G01C 19/5684 73/504.12 |
| 2015/0276405 A1 * | 10/2015 | Rastegar | G01C 19/5776 73/504.12 |
| 2015/0276407 A1 | 10/2015 | Bhandari | |
| 2016/0231112 A1 * | 8/2016 | Stewart | G01C 19/5677 |
| 2016/0334213 A1 * | 11/2016 | Dewall | G01C 19/5712 |

FOREIGN PATENT DOCUMENTS

| | | | | |
|---|---|---|---|---|
| EP | 1775551 A1 | 4/2007 | | |
| EP | 2239541 A1 | 10/2010 | | |
| EP | 2829843 A1 * | 1/2015 | | H03M 3/30 |
| GB | 2311136 A | 9/1997 | | |
| WO | 03078302 A2 | 9/2003 | | |
| WO | WO 2005075939 A1 * | 8/2005 | | G01C 19/5677 |
| WO | 2009037499 A1 | 3/2009 | | |
| WO | 2015052487 A1 | 4/2015 | | |
| WO | 2015097435 A1 | 7/2015 | | |
| WO | 2015124910 A1 | 8/2015 | | |
| WO | 2015140537 A1 | 9/2015 | | |

OTHER PUBLICATIONS

European Search Report Issue in EP Application No. 17155260.7, dated Jun. 21, 2017, 10 Pages.

* cited by examiner

INERTIAL SENSORS

FOREIGN PRIORITY

This application claims priority to United Kingdom Patent Application No. 1602331.9 filed Feb. 9, 2016, the entire contents of which is incorporated herein by reference.

TECHNICAL FIELD

The present disclosure relates to inertial sensors, particularly Microelectromechanical Systems (MEMS)-based vibrating ring sensors that can be used for the measurement of linear acceleration(s) and/or angular rate(s), e.g. in inertial measurement units (IMUs).

BACKGROUND

The term "inertial sensor" is used in the field of electronic sensors to encompass both accelerometers (sensors that measure linear acceleration) and gyroscopes (sensors that measure angular rate). Microelectromechanical Systems (MEMS)-based accelerometers and gyroscopes have become ubiquitous in recent years, and are often far more effective than their conventional macroscopic counterparts.

There is an array of different designs that are used in order to implement these MEMS-based accelerometers and gyroscopes. MEMS-based linear accelerometers typically use a comb-like structure comprising sets of interdigitated fixed and moveable "fingers" that can be used to sense a physical displacement therebetween, wherein the displacement is proportional to an applied linear acceleration. Capacitive, inductive or piezoelectric sensing techniques may be used.

By way of contrast, MEMS-based gyroscopes are typically implemented using vibrating structures and are often referred to in the art as "vibrating structure gyroscopes" or "VSGs". These VSGs typically use a planar structure such as a ring or cylinder that are made to vibrate in a cos nθ mode of vibration (e.g. n=2) as discussed, for example, in EP0565384 and U.S. Pat. No. 7,637,156. Briefly, in a cos 2θ mode of vibration, every point on the vibrating structure moves radially—e.g. in a straight line from the centre of the ring—except for 'nodes' at 90° intervals around the structure which remain stationary. When a rotation is applied, the Coriolis force causes points on the vibrating structure that are moving radially outwards at any given point in time to "bend" in one direction, while points on the structure that are moving radially inwards at that same point in time bend in the other direction. The angular rate (e.g. measured in degrees per second) can then be determined by either detecting the amount by which these nodes move with respect to each other (known as "open loop measurement") or by applying a restorative force to keep the structure vibrating solely in the original cos 2θ mode wherein the restorative force is proportional to the applied angular rate (known as "closed loop measurement"), nullifying any oscillatory motion in the secondary mode of vibration. Such an angular rate sensor (commonly referred to as a gyroscope) uses primary and secondary drive and pick-off transducers. A primary control loop maintains resonance of the vibrating structure by generating a 90° phase shift between the primary drive and pick-off transducers. A secondary control loop receives a signal indicative of rotation from the secondary pick-off transducer and nulls the secondary drive transducer to zero. In addition to the oscillatory signals applied to the primary and secondary drive transducers, the vibrating structure must be biased with a direct current (DC) voltage offset in order for resonance to be achieved.

Self-contained systems known as "inertial measurement units" (IMUs) containing a plurality of inertial sensors such as accelerometers and/or gyroscopes are typically used in aircraft, spacecraft, watercraft, unmanned aerial vehicles (UAVs) and guided missile systems to provide inertial navigation. For example, an IMU providing six degrees of freedom of inertial sensing may comprise three MEMS-based vibrating ring gyroscopes and a plurality of accelerometers arranged to measure linear acceleration along three axes. However, the Applicant has now appreciated that a single inertial sensor may be capable of measuring both angular rate(s) and linear acceleration(s).

The Applicant has also appreciated that typical VSGs suffer from "charge trapping", because the direct current (DC) bias that is applied to the vibrating structure causes long term scale factor and bias drift, preventing the VSG from being used in high performance applications. This occurs when DC bias signals are used for extensive periods of time and charges may become "trapped", altering the bias level of the VSG.

SUMMARY

The present disclosure, when viewed from a first aspect, provides an inertial sensor comprising:

a substantially planar, rotationally symmetric proof mass mounted to a fixed substrate by a plurality of flexible support legs so as to be laterally moveable in a first in-plane sensing direction in response to an applied linear acceleration in said first sensing direction and to be laterally moveable in a second in-plane sensing direction in response to an applied linear acceleration in said second sensing direction, said second sensing direction being offset from the first sensing direction by a non-zero acute angle;

four pairs of electrodes arranged around the proof mass such that each electrode within a pair is diametrically opposite the other electrode in said pair, wherein a first pair of electrodes is substantially aligned with the first sensing direction, a second pair of electrodes is substantially aligned with the second sensing direction, a third pair of electrodes is substantially aligned perpendicular to the first pair of electrodes and a fourth pair of electrodes is substantially aligned perpendicular to the second pair of electrodes;

a capacitive pick-off circuit connected to the proof mass, the pick-off circuit being arranged to provide a sensing signal dependent on any applied linear acceleration and/or angular rate; and an electrical drive circuit connected to the four pairs of electrodes, wherein the drive circuit is arranged to:

apply first in-phase and anti-phase pulse width modulation (PWM) drive signals with a first frequency to the first and third electrode pairs, such that one electrode in each pair is provided with in-phase PWM drive signals and the other electrode in each pair is provided with anti-phase PWM drive signals;

apply second in-phase and anti-phase PWM drive signals with a second frequency, different to the first frequency, to the second and fourth electrode pairs, such that one electrode in each pair is provided with in-phase PWM drive signals and the other electrode in each pair is provided with anti-phase PWM drive signals;

wherein the first and second in-phase and anti-phase PWM drive signals are modulated such that the drive signals applied to the first and second electrode pairs are modulated with an in-phase resonance signal at a resonant frequency of the proof mass and the third and fourth electrode pairs are modulated with a quadrature resonance signal at the resonant frequency of the proof mass such that the in-phase and quadrature resonance signals cause the proof mass to oscillate in-plane in a cos 2θ mode of vibration.

The present disclosure, when viewed from a second aspect, provides a method of operating an inertial sensor comprising:

a substantially planar, rotationally symmetric proof mass mounted to a fixed substrate by a plurality of flexible support legs so as to be laterally moveable in a first in-plane sensing direction in response to an applied linear acceleration in said first sensing direction and to be laterally moveable in a second in-plane sensing direction in response to an applied linear acceleration in said second sensing direction, said second sensing direction being offset from the first sensing direction by a non-zero acute angle; and four pairs of electrodes arranged around the proof mass such that each electrode within a pair is diametrically opposite the other electrode in said pair, wherein a first pair of electrodes is substantially aligned with the first sensing direction, a second pair of electrodes is substantially aligned with the second sensing direction, a third pair of electrodes is substantially aligned perpendicular to the first pair of electrodes and a fourth pair of electrodes is substantially aligned perpendicular to the second pair of electrodes;

the method comprising:

connecting a capacitive pick-off circuit to the proof mass to provide a sensing signal dependent on any applied linear acceleration and/or angular rate;

applying first in-phase and anti-phase pulse width modulation (PWM) drive signals with a first frequency to the first and third electrode pairs, such that one electrode in each pair is provided with in-phase PWM drive signals and the other electrode in each pair is provided with anti-phase PWM drive signals; and applying second in-phase and anti-phase PWM drive signals with a second frequency, different to the first frequency, to the second and fourth electrode pairs, such that one electrode in each pair is provided with in-phase PWM drive signals and the other electrode in each pair is provided with anti-phase PWM drive signals;

wherein the first and second in-phase and anti-phase PWM drive signals are modulated such that the drive signals applied to the first and second electrode pairs are modulated with an in-phase resonance signal at a resonant frequency of the proof mass and the third and fourth electrode pairs are modulated with a quadrature resonance signal at the resonant frequency of the proof mass such that the in-phase and quadrature resonance signals cause the proof mass to oscillate in-plane in a cos 2θ mode of vibration.

Thus it will be appreciated that the present disclosure provides an inertial sensor that implements a single vibrating ring-type proof mass which is capable of providing measurements of in-plane linear acceleration and/or a rate of an in-plane rotation (i.e. an angular velocity). That is to say that the inertial sensor of the present disclosure can provide measurements of in-plane linear acceleration along either one or two axes and additionally, or alternatively, a measurement of an in-plane angular rate. It will be appreciated that the term "in-plane angular rate" should be understood to mean the rate of an angular motion in the plane defined by the first and second sensing directions—i.e. a rotation around an axis normal to the plane.

As the pairs of electrodes are arranged such that those corresponding to the first sensing direction (i.e. the first and third pairs of electrodes) are driven with PWM drive signals at a different frequency to the PWM drive signals applied to the electrodes corresponding to the second sensing direction (i.e. the second and fourth pairs of electrodes), the resulting sensing signal can be demodulated at the first and second frequencies separately in order to obtain information regarding accelerations pertaining to the first and second sensing directions respectively as well as an in-plane angular rate. Accordingly, in some examples the drive circuit is further arranged to:

demodulate the sensing signal at the first frequency to obtain a first linear acceleration signal and/or an angular rate signal;

demodulate the sensing signal at the second frequency to obtain a second linear acceleration signal and/or an angular rate signal; and determine from the first and second linear acceleration signals a linear acceleration in the first sensing direction; determine from the first and second linear acceleration signals a linear acceleration in the second sensing direction; and/or determine from the angular rate signal(s) an in-plane angular rate.

Furthermore, it will be appreciated that the inertial sensor of the present disclosure only uses alternating current (AC) signals—i.e. the PWM and resonance signals—and there is no requirement to apply any DC bias signal to the vibrating proof mass as would be the case in conventional vibrating ring-based gyroscopes, thus preventing the ability for charge to build up, avoiding the issues relating to charge trapping as outlined previously.

It will be appreciated that the proof mass could comprise any substantially planar, rotationally symmetric shape such as a cylindrical or octagonal shape. However, in preferred examples the proof mass comprises a ring or other substantially annular structure.

It will be appreciated that the first and second sensing directions can be offset from one another by any angle greater than 0° and less than 90°. However, the secondary mode of vibration of the proof mass is typically offset from the primary mode of vibration by 45° and thus, at least in preferred examples, the second sensing direction is offset from the first sensing direction by 45°. This provides the device with a high degree of rotational symmetry, evenly distributing forces across the device.

In preferred examples, one of the first and second frequencies is an even integer multiple of the other. This harmonic relationship makes the signal processing simpler, though it is not necessary. However, in practice both the first and second frequencies (i.e. the frequencies of the first and second PWM drive signals respectively) must be at least twice the resonant frequency used in order to prevent aliasing when the signals are demodulated.

While there are different types of pick-offs known in the art per se, in some examples the capacitive pick-off circuit comprises a capacitive pick-off input and a charge amplifier arranged to integrate an input current from the capacitive pick-off input and provide the sensing signal, said sensing signal having a voltage proportional to the integrated input current.

While the demodulation process used to extract the information pertaining to linear accelerations in each of the first and second sensing directions and/or an in-plane angular rate could be carried out independently by a separate unit (e.g. on a microprocessor), in some examples the drive circuit comprises a first demodulation circuit arranged to demodulate the sensing signal at the first frequency and a second demodulation circuit arranged to demodulate the sensing signal at the second frequency. These demodulation circuits allow for local demodulation of the sensing signal within the inertial sensor itself, whereby the resulting linear acceleration and/or angular rate signals could be used as part of a feedback loop e.g. influencing the drive signals applied to the electrodes as is the case in closed loop operations of the inertial sensor for obtaining one or two axis acceleration(s) and/or angular rate measurement(s).

In some further examples, the pick-off circuit further comprises a resonant frequency demodulation circuit arranged to demodulate the sensing signal at the resonant frequency to obtain an angular rate signal—which exists at the resonant frequency—such as an angular rate around an axis normal to the plane defined by the first and second sensing directions. In some examples, the pick-off circuit comprises a bandpass filter arranged to substantially reject signals with a frequency substantially different to the resonant frequency. By only allowing the signals at the resonant frequency to pass, the angular rate signal can be readily isolated from the linear acceleration signals. In alternative examples, the pick-off circuit comprises a high-pass filter arranged to substantially reject signals substantially below the resonant frequency.

In some examples, the pick-off circuit comprises a rejection filter arranged to substantially reject signals having the resonant frequency. Typically the linear acceleration signals will be baseband e.g. 0 to 200 Hz while the angular rate signal is at the resonant frequency e.g. 14 kHz and thus by "notching out" the signals at the resonant frequency, the linear acceleration signals can be readily isolated from the angular rate signal. In alternative examples, the pick-off circuit comprises a low-pass filter arranged to substantially reject signals substantially above the resonant frequency. In some examples, the pick-off circuit comprises an accelerometer loop filter. This accelerometer loop filter is used when the inertial sensor is in use as a closed loop accelerometer. Since the linear acceleration signals will be baseband e.g. 0 to 200 Hz, the presence of the rejection or low-pass filter means that the accelerometer loop filter need only provide a relatively low bandwidth (e.g. of a few hundred Hertz) by which can be achieved by using an integrator. While the filter or filters may comprise analogue filters, in preferred examples the filter or filters are digital filters.

The Applicant has appreciated that the inertial sensor described hereinabove can be operated as a closed loop accelerometer for measuring linear accelerations along one or two in-plane axes. In some preferred examples, the drive circuit is arranged to provide drive signals that generate electrostatic restoring forces to balance linear mechanical inertial forces resulting from an applied linear acceleration so as to maintain the operating point of the proof mass at a null position. In such examples the disclosed method further comprises varying the mark:space ratios of the first and second drive signals so that linear mechanical inertial forces resulting from applied linear accelerations in the first and second sensing directions are balanced by electrostatic restoring forces to maintain the operating point of the proof mass at a null position.

In the above examples, the mark:space ratios of the first and second drive signals are varied so as to maintain the proof mass at the null position. However, the Applicant has appreciated that the mark:space ratios may also be varied in order to realise the desired oscillatory motion of the ring. Accordingly, in some examples modulating a PWM drive signal with a resonance signal comprises varying the mark:space ratio of said PWM drive signal between a first mark:space ratio value and a second mark:space ratio value at the frequency of the resonance signal. Thus it will be seen that while the mark:space ratio may be varied in order to counteract linear motions (i.e. providing closed loop accelerometer functionality), the mark:space ratio may also be varied e.g. periodically at the resonant frequency in order to provide gyroscope functionality. It will be appreciated that the term "between a first mark:space ratio value and a second mark:space ratio value" should be understood to mean the ratio of the proportion of time the PWM drive signal is high (i.e. the "mark") as opposed to the proportion of time it is low (i.e. the "space") in a given cycle is varied between upper and lower bounds, either in discrete steps or, more preferably, on a continuous scale while the frequency of the PWM drive signal remains constant.

In some examples, the drive circuit comprises a phase locked loop circuit arranged to drive a voltage-controlled oscillator (VCO) at the resonant frequency, the voltage controlled-oscillator being arranged to provide the resonance signal that is modulated onto the first in-phase and anti-phase pulse width modulation (PWM) drive signals. This phase locked loop circuit is used when the inertial sensor is used to determine an angular rate (i.e. it is acting in a gyroscope mode) and is arranged to adjust the frequency of the VCO which produces the resonance signal modulated onto the PWM drive signals, such that this "servo" feedback loop provides a mechanism for adjusting the frequency to iteratively match the resonant frequency of the proof mass. This resonance signal produced by the VCO may be used by the resonant frequency demodulation circuit where appropriate.

In some further examples, the drive circuit comprises: a gain control loop circuit including an amplitude detection circuit arranged to determine an amplitude of the sensing signal; a gain controller arranged to compare the amplitude of the sensing signal to a reference amplitude and produce a gain control signal that is dependent on the difference therebetween; and a variable amplifier arranged to control an amplitude of one or more PWM drive signals in response to the gain control signal. This gain control loop circuit is arranged to stabilise the amplitude of motion of the proof mass as it resonates.

In some examples, the drive circuit comprises an in-phase modulation circuit arranged to modulate the second in-phase and anti-phase PWM signals with the in-phase resonance signal and a quadrature modulation circuit arranged to modulate the second in-phase and anti-phase PWM signals with the in-quadrature resonance signal in order to nullify any oscillation of the proof mass in a secondary mode of vibration. In some such examples, the method further comprises varying the mark:space ratio of the second in-phase and anti-phase PWM drive signals between a first mark:space ratio value and a second mark:space ratio value at the frequency of the resonance signal, wherein the first and second mark:space ratio values depend on the amplitude of the oscillation of the proof mass in a secondary mode of vibration. This provides closed loop gyroscope functionality, known in the art per se, wherein any motion in the secondary mode of vibration is nullified rather than measured directly.

In some examples, the method further comprises transforming a skew coordinate system having axes corresponding to the first and second sensing directions to an orthogonal coordinate system having orthogonal axes.

BRIEF DESCRIPTION OF DRAWINGS

One or more non-limiting examples will now be described with reference to the accompanying drawings, in which.

DETAILED DESCRIPTION

Figure 1:
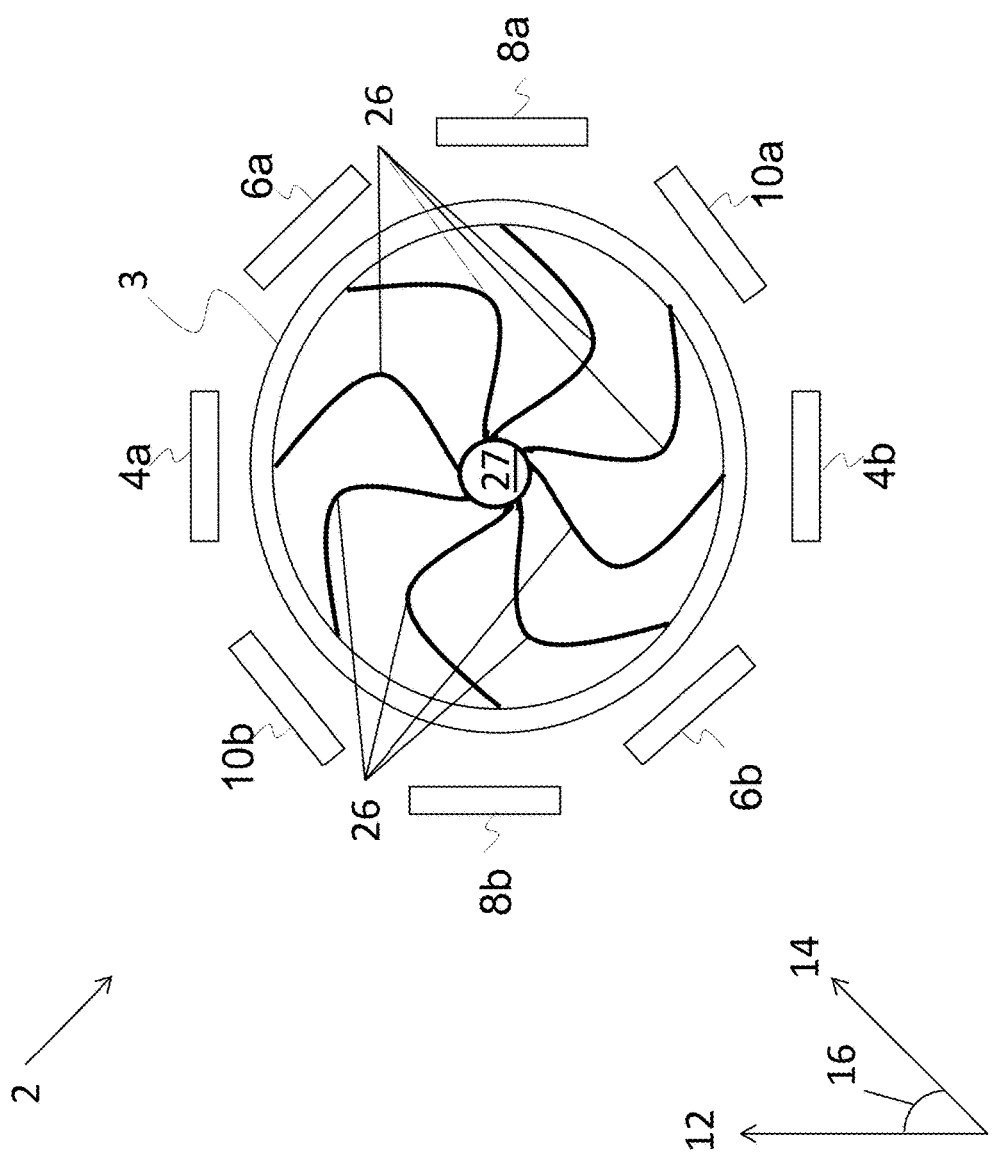
FIG. 1 shows a schematic diagram of an inertial sensor in accordance with an example of the present disclosure.

FIG. 1 shows a schematic diagram of an inertial sensor 2 in accordance with an example of the present disclosure. In this example, the sensor 2 comprises a planar ring structure 3 having eight radially compliant, flexible legs 26 connected to a central hub 27. This ring structure 3 is surrounded by four pairs of diametrically-opposed electrodes: 4a, 4b; 6a, 6b; 8a, 8b; and 10a, 10b, that are spaced around the ring structure 3.

The first pair of electrodes 4a, 4b are aligned with a first sensing direction 12, while the second pair of electrodes 6a, 6b are aligned with a second sensing direction 14. The first and second sensing directions 12, 14 are both in the plane of the ring structure 3. The third pair of electrodes 8a, 8b are aligned perpendicularly to the first pair of electrodes 4a, 4b. Similarly, the fourth pair of electrodes 10a, 10b are aligned perpendicularly to the second pair of electrodes 6a, 6b.

The two sensing directions 12, 14 are separated by an angle 16 which is dependent on the properties of the proof mass and the relative angular separation of its modes of oscillation. In this particular example, the primary and secondary modes of oscillation (described with reference to FIGS. 3a and 3b below) are separated by 45° and thus the angle 16 separating the two sensing directions 12, 14 is also 45°.

Figure 2:
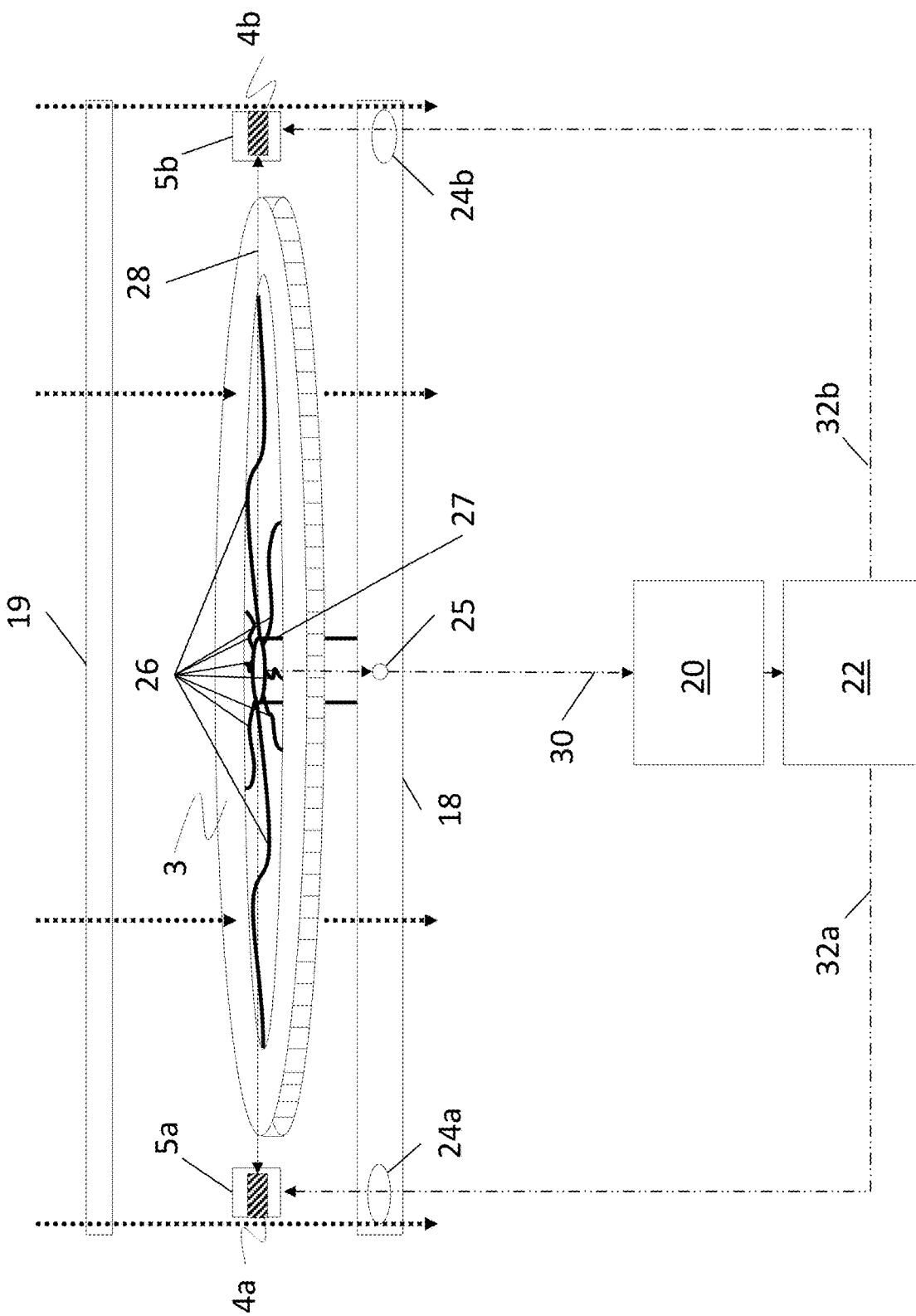
FIG. 2 shows a simplified perspective view of the sensor of FIG. 1 illustrating the connections associated with a pair of electrodes, sensing circuitry, and drive circuitry.

FIG. 2 shows a simplified perspective view of the sensor 2 of FIG. 1 illustrating the connections associated with: the ring structure 3; one of the pairs of electrodes, in this case the first pair of electrodes 4a, 4b; sensing circuitry, and drive circuitry. The ring structure 3 is supported on a substrate 18 by its flexible support legs 26 connected to the central hub 27 as to be: laterally moveable in-plane in the first sensing direction 12 in response to an applied linear acceleration in said first sensing direction 12; laterally moveable in-plane in a second sensing direction 14 in response to an applied linear acceleration in said second sensing direction 14; and radially compliant to allow the ring structure 3 to oscillate in a cos 2θ mode of vibration. The ring structure 3, support legs 26, and central hub 27 may all in fact be monolithic and manufactured from the same semiconducting substrate e.g. from silicon. This may be achieved, by way of non-limiting example only, using deep reactive-ion etching (DRIE) as is well documented per se. Accordingly, the sensor 2 may be manufactured as a MEMS-based device. The ring structure 3, support legs 26, and central hub 27 may be "sandwiched" between lower and upper glass substrates 18, 19 (as indicated by the thick dashed arrows passing through the three layers) to form an evacuated, hermetically sealed structure. The electrodes 4a, 4b are each surrounded with a peripheral layer of silicon 5a, 5b such that the electrodes 4a, 4b are sandwiched between silicon layers, which are in turn sandwiched between the lower and upper glass substrates 18, 19.

Typically the sensor 2 is manufactured by precavitating the upper and lower glass substrates 18, 19 e.g. by "etching out" the area in which the semiconducting structures are to reside. A layer of semiconducting substrate e.g. silicon is then anodically bonded to one of the glass layers 18,19. The silicon structure (i.e. the ring structure 3, support legs 26, and central hub 27) are then formed by etching away the anodically bonded silicon. A getter is then applied and the component sealed within a vacuum chamber in order to create a hermetically sealed structure. The getter acts to remove any residual adsorbed gas within the structure that may be released over time after the sensor 2 is fully sealed.

The substrate 18 is provided with a number of "downhole vias", only three of which 24a, 24b, 25 are shown in FIG. 2. Two of these downhole vias 24a, 24b allow for drive connections 32a, 32b to pass from the electrodes 4a, 4b, mounted on the substrate 18 outside the ring structure 3, to the drive circuitry 22. The other downhole via 25 provides an electrical connection 30 from the central hub 27 of the conductive silicon ring structure 3 which passes down through the substrate 18 to the sensing circuitry 20.

The sensing connection 30 provides a sensing signal picked up from the silicon ring structure 3 which acts as a capacitive pick-off signal to the sensing circuitry 20. The silicon is highly doped and thus sufficiently conductive to be used as a pick-off. In contrast, the drive connections 32a, 32b are used to provide pulse width modulation (PWM) drive signals to the electrodes 4a, 4b as will be described in greater detail below. These drive connections 32a, 32b also include metal tracking that runs along the outer glass surface from the downhole vias 24a, 24b to appropriate wire bonding pads (not shown). The drive signals from the drive circuitry 22 provide an oscillatory electric field 28 between the electrodes 4a, 4b which causes the ring to vibrate in a primary carrier mode in a manner described below with reference to FIGS. 3a and 3b. The drive signals applied to the other electrode pairs 6a, 6b, 8a, 8b, 10a, 10b are carried by similar drive connections.

Figure 3:
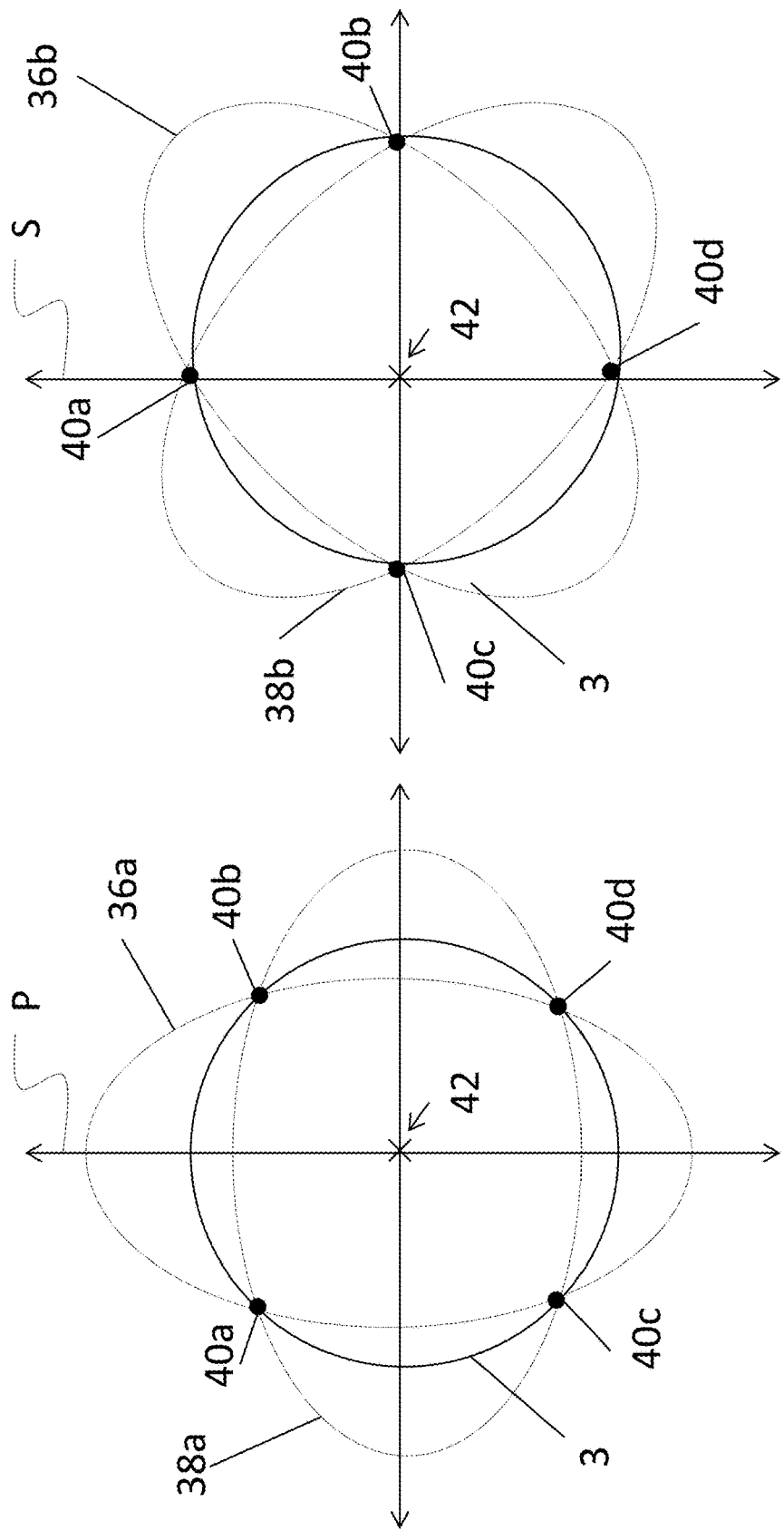
FIGS. 3a and 3b illustrates the primary cos 2θ mode of vibration associated with the sensor 2 of FIG. 1.

FIG. 3a illustrates the primary cos 2θ mode of vibration associated with the sensor 2 of FIG. 1. In this mode, by driving the first pair of electrodes 4a, 4b at the resonant frequency—in this example 14 kHz—the ring structure 3 is excited into a primary carrier mode P such as the cos 2θ mode. In this Figure, the dotted lines 36a, 38a indicate the extremes of motion of the ring structure 3 in the primary carrier mode P. It can be seen that there is zero radial motion at the node points 40a, 40b, 40c, 40d.

When the ring structure 3 is rotated around an axis 42 normal to the plane of the ring structure 3, a Coriolis force is generated which causes the ring structure 3 to vibrate in a secondary response mode S such as the sin 2θ mode as illustrated in FIG. 3b. In FIG. 3b, the dotted lines 36b, 38b indicate the extremes of motion of the ring structure 12 in the secondary response mode S. The amplitude of the induced motion is directly proportional to the applied angular rate about the axis 42 normal to the plane of the ring structure 3. As the ring structure 3 is rotated around the axis 42, the points on the ring that are moving radially outwards at any given point in time to "bend" in one direction, while points on the ring structure 3 that are moving radially inwards at that same point in time "bend" in the other direction. As a result, the position of the nodes 40a, 40b, 40c, 40d is shifted by a small angle depending on the magnitude of the rate of angular rotation and there is a finite amplitude at the position of the secondary electrodes 6a, 6b, 10a, 10b. In a conventional gyroscope, the secondary mode is detected using a pick-off signal from the second pair of electrodes 6a, 6b. However, as will be explained below, according to this disclosure the normal sinusoidal drive signal is replaced with in-phase and anti-phase pulse width modulation (PWM) drive signals applied to the four pairs of electrodes so that the sensor 2 can provide both gyroscope and linear accelerometer functionality.

Figure 4:
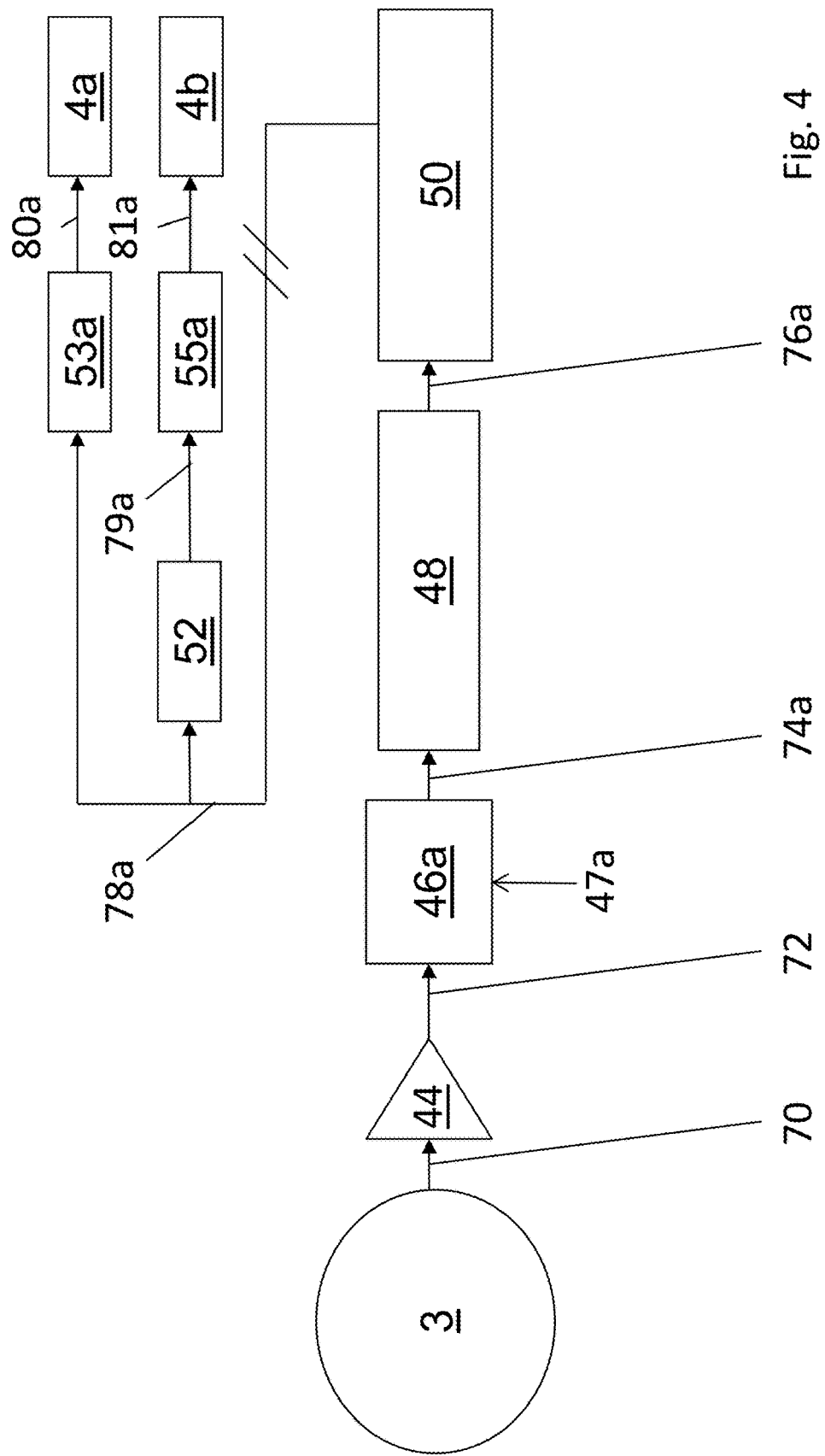
FIG. 4 shows a block diagram of the sensor of FIG. 1 connected for use as a closed loop accelerometer that senses linear motion in the first sensing direction.

FIG. 4 shows a block diagram of the sensor 2 of FIG. 1 connected for use as a closed loop accelerometer that senses linear acceleration in the first sensing direction 12 of FIG. 1. A sensing signal 70 is capacitively picked off from the ring structure 3 (e.g. using the sensing connection 30 seen in FIG. 2) and input to a charge amplifier 44, which integrates the current associated with the sensing signal 70 and produces a sense voltage 72 as an output from the sensing circuitry. Unlike a conventional vibrating ring structure gyroscope, this sense voltage 72 is then input to the drive circuitry to provide closed loop feedback. The sense voltage 72 is input to a first demodulator 46a which is arranged to demodulate the sense voltage 72 at a first PWM frequency. This first frequency is the same as the frequency used for the primary PWM drive signals applied to the first and third electrode pairs 4a, 4b, 8a, 8b as will be described in greater detail below. In this particular example, the first frequency is 50 kHz.

A demodulated signal 74a is output from the first demodulator 46a—which uses a 50 kHz reference signal 47a for demodulation—and filtered by a rejection or "notch" filter 48 arranged to remove frequency components equal to the resonant frequency i.e. 14 kHz so as to produce a reject filtered signal 76a. This reject filtered signal 76a is then input to a loop filter 50 which may be realised using e.g. a simple integrator.

The loop filter 50 produces a loop filter output signal 78a which is input directly to a first PWM generator 53a and indirectly to a second PWM generator 55a via a phase inverter 52. The loop filter output signal 78a of the loop filter 50 and its inverted version 79a are used to vary the mark:space ratio of PWM drive signals 80a, 81a generated by the first and second PWM generators 53a, 55a respectively in response to the magnitude of thereof. The first drive signal 80a produced by the first PWM generator 53a is applied directly to one electrode 4a in the first electrode pair, and the second drive signal 81a produced by the second PWM generator 55a is applied to the other electrode 4b in the first pair, such that anti-phase, 50 kHz, PWM signals are applied across the first electrode pair 4a, 4b. These PWM signals alternately provide "high" and "low" voltages to the electrodes, periodically reversing the current and thus preventing charges from building up and getting trapped at the electrodes. Under acceleration in the first sensing direction 12, the ring structure 3 moves laterally "top to bottom" (or "bottom to top" depending on the direction of acceleration) in-plane between the first electrode pair 4a, 4b, and thus the anti-phase PWM drive signals 80a, 81a apply a restoring force to bring the ring structure 3 back to the null position. In other words, lateral translation of the ring structure 3 in-plane is nullified and the restoring force is proportional to the applied acceleration.

Thus it will be seen that the mark:space ratios of the first drive signals 80a, 81a can then be adjusted in accordance with the loop filter output signal 78a for closed loop operation such that linear mechanical inertial forces in the first sensing direction 12 are balanced by electrostatic restoring forces in order to maintain the operating point of the ring structure 3 at a null position.

Alternatively, by maintaining the mark:space ratio of the drive signals 80a, 81a at 50:50, the sensor 2 can be operated in open loop mode i.e. without feedback. The lateral displacement is then linearly proportional to the applied acceleration and the demodulated signal 74a (or the filtered signal 76a) is then a measure of linear acceleration in the first sensing direction 12.

Figure 5:
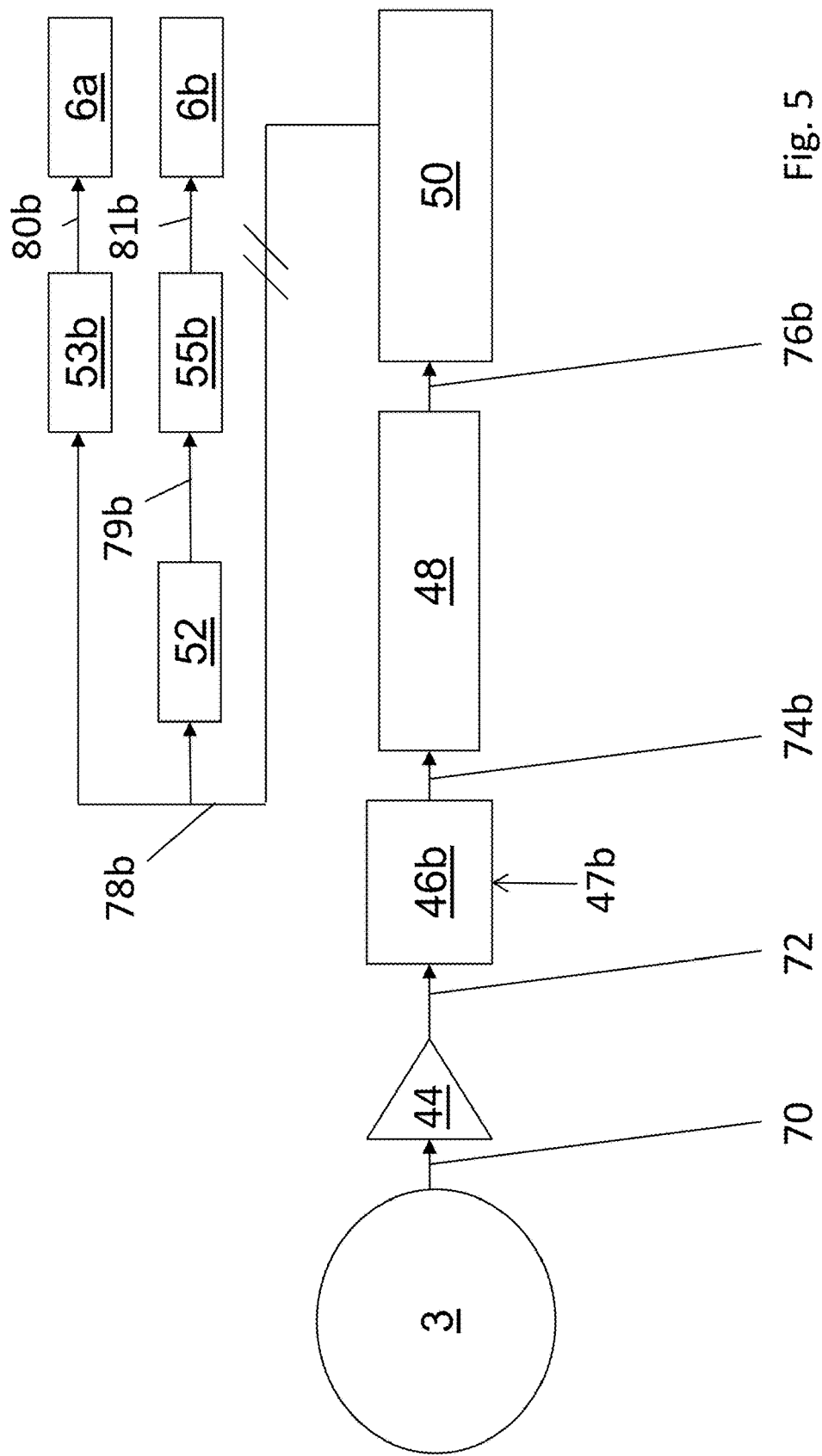
FIG. 5 shows a block diagram of the sensor of FIG. 1 connected for use as a closed loop accelerometer that senses linear motion in the second sensing direction.

FIG. 5 shows a block diagram of the sensor 2 of FIG. 1 connected for use as a closed loop accelerometer that senses linear acceleration in the second sensing direction 14 of FIG. 1. Similarly to the block diagram shown in FIG. 4, the sensing signal 70 is capacitively picked off from the ring structure 3 (e.g. from the central hub 27) and input to a charge amplifier 44, which integrates the current associated with the sensing signal 70 and produces a sense voltage 72.

In the drive circuitry, the sense voltage 72 is input to a second demodulator 46b which is arranged to demodulate the sense voltage 72 at a second PWM frequency which is different to the first PWM frequency. This second PWM frequency is the same as the frequency used for the secondary drive signals applied to the second and fourth electrode pairs 6a, 6b, 10a, 10b as will be described in greater detail below. In this particular example, the second frequency is 100 kHz.

A demodulated signal 74b is output from the second demodulator 46b—which uses a 100 kHz reference signal 47b for demodulation—and filtered by a rejection or "notch" filter 48 arranged to remove frequency components equal to the resonant frequency i.e. 14 kHz so as to produce a reject filtered signal 76b. This reject filtered signal 76b is then input to the loop filter 50.

The loop filter 50 produces a loop filter output signal 78b, which is input directly to a first PWM generator 53b and indirectly to a second PWM generator 55b via a phase inverter 52. The loop filter output signal 78b of the loop filter 50 and its inverted version 79b are used to vary the mark:space ratio of PWM drive signals 80b, 81b generated by the first and second PWM generators 53b, 55b respectively in response to the magnitude of thereof. The first drive signal 80b produced by the first PWM generator 53b is applied directly to one electrode 6a in the second electrode pair, and the second drive signal 81b produced by the second PWM generator 55b is applied to the other electrode 6b in the second pair, such that anti-phase, 100 kHz, PWM signals are applied across the second electrode pair 6a, 6b.

As before, the mark:space ratio of the second drive signals 80*b*, 81*b* can then be adjusted in accordance with the magnitude of the loop filter output signal 78*b* in closed loop operation so that linear mechanical inertial forces in the second sensing direction 14 are balanced by electrostatic restoring forces in order to maintain the operating point of the ring structure 3 at a null position. Alternatively, by maintaining the mark:space ratio of the drive signals 80*b*, 81*b* at 50:50, the sensor 2 can be operated in open loop mode i.e. without feedback. The lateral displacement is then linearly proportional to the applied acceleration and the demodulated signal 74*b* (or the filtered signal 76*b*) is then a measure of linear acceleration in the second sensing direction 14.

The linear accelerometer operation described hereinabove with reference to FIGS. 4 and 5 means that the PWM drive signals applied to two of the electrode pairs 4*a*, 4*b*; 6*a*, 6*b* provide the sensor 2 with a unique ability to measure any linear accelerations in the first and second in-plane sensing directions 12, 14 using the vibrating ring structure 3. It will be appreciated that by applying a rotation matrix, the measurements in the sensing directions 12, 14 can be readily resolved to orthogonal axes, e.g. for use with a Cartesian coordinate system. Accordingly, there is disclosed a vibrating ring-based inertial sensor 2 that couples two axes of linear acceleration (e.g. x and y) with the normal functionality of a z-axis gyroscope. Gyroscope operation of the inertial sensor 2 will now be described.

Figure 6:
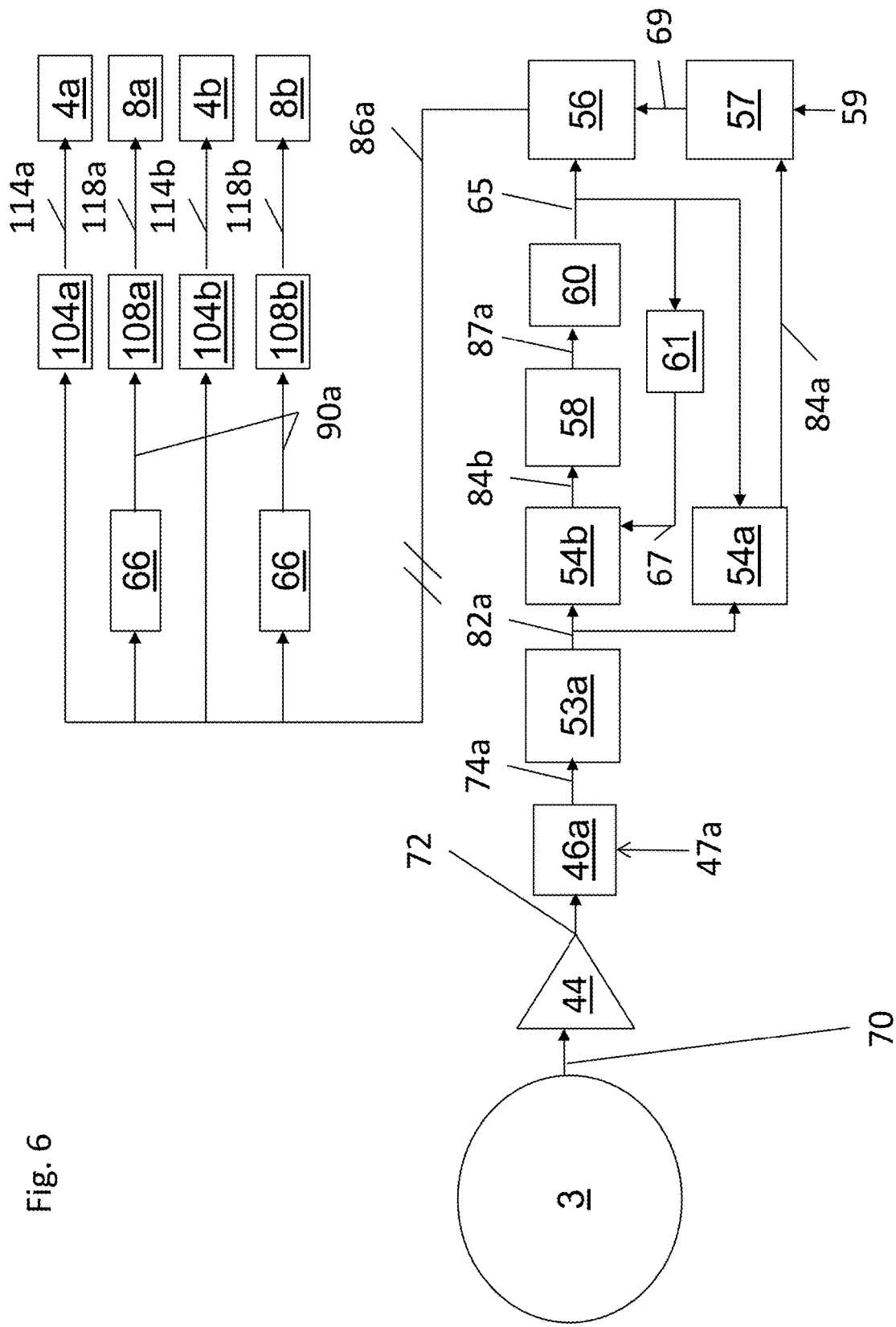
FIG. 6 shows a block diagram of the primary drive and pick-off connections used with the sensor of FIG. 1 when used as a closed loop gyroscope for sensing in-plane angular motion.

FIG. 6 shows a block diagram of the primary drive and pick-off circuitry used with the sensor 2 of FIG. 1 when used as a closed loop gyroscope for sensing the rate of an in-plane angular motion e.g. around the axis 42 seen in FIGS. 3*a* and 3*b*. Similarly to the accelerometer configuration described hereinabove with reference to FIGS. 4 and 5, the sensing signal 70 is capacitively picked off from the ring structure 3 (e.g. from the central hub 27) and input to a charge amplifier 44, which integrates the current associated with the sensing signal 70 and produces a sense voltage 72 as an output from the sensing circuitry. Unlike a conventional vibrating ring structure gyroscope, this sense voltage 72 is input to the drive circuitry to provide closed loop feedback.

Firstly, the sense voltage 72 is input to a first demodulator 46*a* which is arranged to demodulate the sense voltage 72 at a first PWM frequency. This first PWM frequency is the same as the frequency used for the primary drive signals applied to the first and third electrode pairs 4*a*, 4*b*, 8*a*, 8*b*. As before, the first frequency is 50 kHz and the first demodulator 46*a* uses a 50 kHz reference frequency 47*a* in order to perform the demodulation.

A demodulated signal 74*a* is output from the first demodulator 46*a* and filtered by a high-pass filter 53*a* arranged to remove frequency components below the resonant frequency i.e. 14 kHz so as to produce a high-pass filtered signal 82*a*. This high-pass filtered signal 82*a* is then input to a quadrature resonant frequency demodulator 54*b* and an in-phase resonant frequency demodulator 54*a* which are arranged to demodulate the high-pass filtered signal 82*a* at the resonant frequency (i.e. 14 kHz) in order to obtain the gyroscopic data at the resonant frequency that corresponds to angular rotations.

The quadrature resonant frequency demodulator 54*b* produces a quadrature angular rotation signal 84*b*. The quadrature angular rotation signal 84*b* produced by the quadrature resonant frequency demodulator 54*b* is then input to a loop filter 58 having a frequency-dependent transfer function F(s). This loop filter 58 produces a loop filter output signal 87*a* which is then input to a voltage controlled oscillator (VCO) 60. This VCO 60 produces a resonance signal 65 of approximately 14 kHz. However, the exact frequency of the signal 65 will depend on the output 87*a* of the loop filter 58 and will iteratively converge on the resonant frequency of the ring structure 3. The resonance signal 65 is passed through a 90° phase shifter 61 to produce a quadrature resonance signal 67. The resonance and quadrature resonance signals 65, 67 are then fed back to the in-phase and quadrature resonant frequency demodulators 54*a*, 54*b* in order to facilitate demodulation at the correct frequency currently being used to drive the ring structure 3 to resonance.

The in-phase resonant frequency demodulator 54*a* produces an in-phase angular rotation signal 84*a*. The in-phase angular rotation signal 84*a* produced by the in-phase resonant frequency demodulator 54*a* is input to an amplitude comparator 57. This comparator 57 compares the amplitude of the in-phase angular rotation signal 84*a* to a reference amplitude 59. The comparator 57 produces a gain control signal 69 that is dependent on the difference between these amplitudes. This gain control signal 69 is input to an automatic gain control (AGC) variable amplifier 56 which then amplifies the resonance signal 65 produced by the VCO 60 in order to produce a scaled resonance signal 86*a* having a fixed, desired amplitude (as set by the reference amplitude 59). This then sets the amplitude of the oscillations in the primary cos 2θ mode.

The scaled resonance signal 86*a* (having a frequency of approximately 14 kHz as determined by the loop filter 58) is then input to an inverter 66 to produce an inverted scaled resonance signal 90*a*. The scaled resonance signal 86*a* is input to two PWM drivers—a non-inverted 50 kHz PWM driver 104*a* and an inverted 50 kHz PWM driver 104*b*. Similarly, the inverted scaled resonance signal 90*a* is input to two PWM drivers—a non-inverted 50 kHz PWM driver 108*a* and an inverted 50 kHz PWM driver 108*b*.

These PWM drivers 104*a*, 104*b*, 108*a*, 108*b* remodulate the 14 kHz scaled resonance 86*a* and inverted scaled resonance 90*a* signals onto the 50 kHz PWM drive signals to provide a remodulated drive signals 114*a*, 114*b*, 118*a*, 118*b* respectively, wherein the 14 kHz signal causes the mark:space ratio of the 50 kHz PWM drive signal to vary between lower and upper mark:space ratio values at 14 kHz. The remodulation is carried out such that each of the electrodes 4*a*, 4*b*, 8*a*, 8*b* is driven with a different pairing of phase-related signals. More specifically: electrode 4*a* is driven with an in-phase 50 kHz PWM signal 114*a* modulated with an in-phase 14 kHz resonant frequency signal; electrode 4*b* is driven with an anti-phase 50 kHz PWM signal 114*b* modulated with an in-phase 14 kHz resonant frequency signal; electrode 8*a* is driven with an in-phase 50 kHz PWM signal 118*a* modulated with a quadrature 14 kHz resonant frequency signal; and electrode 8*b* is driven with an anti-phase 50 kHz PWM signal 118*b* modulated with a quadrature 14 kHz resonant frequency signal. In other words, diametrically opposed electrodes are provided with common-phase resonant frequency signals but anti-phase PWM drive signals.

Figure 7:
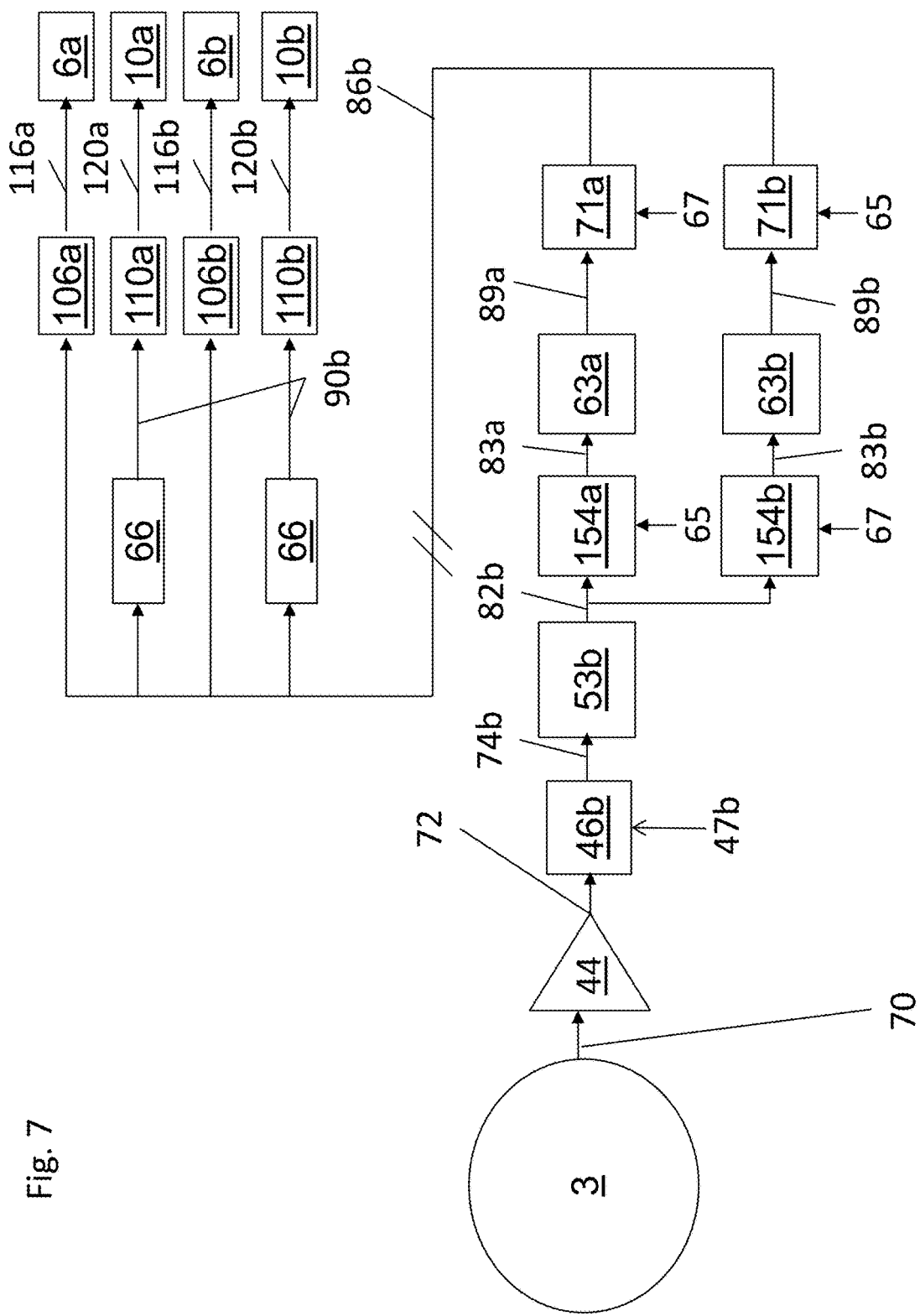
FIG. 7 shows a block diagram of the secondary drive and pick-off connections used with the sensor of FIG. 1 when used as a closed loop gyroscope for sensing in-plane angular motion.

FIG. 7 shows a block diagram of the secondary drive and pick-off connections used with the sensor 2 of FIG. 1 when used as a closed loop gyroscope for sensing a rate of an in-plane angular motion or angular velocity e.g. around the axis 42 seen in FIGS. 3*a* and 3*b*. As before, the sensing signal 70 is capacitively picked off from the ring structure 3 (e.g. from the central hub 27) and input to a charge amplifier 44, which integrates the current associated with the sensing signal 70 and produces a sense voltage 72 as an output from the sensing circuitry. Unlike a conventional vibrating ring structure gyroscope, this sense voltage 72 is input to the drive circuitry to provide closed loop feedback.

Firstly, the sense voltage 72 is input to a second demodulator 46b which is arranged to demodulate the sense voltage 72 at a second PWM frequency which is different to the first PWM frequency. This second PWM frequency is the same as the frequency used for the secondary drive signals applied to the second and fourth electrode pairs 6a, 6b, 10a, 10b. As before, the second frequency is 100 kHz and the demodulator 46b is provided with a 100 kHz reference signal 47b.

A demodulated signal 74b is output from the second demodulator 46b and filtered by a band-pass filter 53b arranged to remove frequency components above and below the resonant frequency i.e. 14 kHz so as to produce a band-pass filtered signal 82b. This band-pass filtered signal 82b is then input to an in-phase resonant frequency demodulator 154a and a quadrature resonant frequency demodulator 154b which are arranged to demodulate the band-pass filtered signal 82b to obtain the gyroscopic data at the resonant frequency that corresponds to angular rotations. The in-phase and quadrature resonant frequency demodulators 154a, 154b are provided with in-phase and quadrature resonant frequency reference signals 65, 67 respectively, as produced by the VCO 60 described hereinabove with reference to FIG. 6.

The quadrature angular rotation signal 83b produced by the quadrature resonant frequency demodulator 154b is then input to a first servo loop filter 63b and the in-phase angular rotation signal 83a produced by the in-phase resonant frequency demodulator 154a is input to a second servo loop filter 63a.

These servo loop filters 63a, 63b act to "close the loop" and nullify any in-phase and quadrature motion in the secondary mode S. The amplitude of the in-phase signal required to nullify this motion (i.e. to keep the ring structure 3 resonating in its primary mode P) is directly proportional to the Coriolis force experienced by the ring structure 3 and thus the applied angular rate. The two servo loop filters 63a, 63b produce in-phase and quadrature loop filter output signals 89a, 89b respectively. The in-phase loop filter output signal 89a is then input to a quadrature resonant frequency remodulator 71a which also takes the quadrature resonant frequency reference signal 67 as an input. Similarly, the quadrature loop filter output signal 89b is then input to an in-phase resonant frequency remodulator 71b which also takes the in-phase resonant frequency reference signal 65 as an input.

The remodulators 71a, 71b remodulate the mark:space ratios of the 100 kHz PWM drive signals with the in-phase and quadrature loop filter output signals 89a, 89b which are combined to provide a remodulated resonance signal 86b. This remodulated resonance 86b is then input to an inverter 66 to produce an inverted remodulated resonance signal 90b. The remodulated resonance signal 86b is input to two PWM drivers—a non-inverted 100 kHz PWM driver 106a and an inverted 100 kHz PWM driver 106b. Similarly, the inverted remodulated resonance signal 90b is input to two PWM drivers—a non-inverted 100 kHz PWM driver 120a and an inverted 100 kHz PWM driver 120b.

These PWM drivers 106a, 106b, 120a, 120b provide remodulated drive signals 116a, 116b, 120a, 120b respectively. The remodulation is carried out such that each of the electrodes 6a, 6b, 10a, 10b is driven with a different pairing of phase-related signals. More specifically: electrode 6a is driven with an in-phase 100 kHz PWM signal 116a modulated with an in-phase 14 kHz resonant frequency signal; electrode 6b is driven with an anti-phase 100 kHz PWM signal 116b modulated with an in-phase 14 kHz resonant frequency signal; electrode 10a is driven with an in-phase 100 kHz PWM signal 120a modulated with a quadrature 14 kHz resonant frequency signal; and electrode 10b is driven with an anti-phase 100 kHz PWM signal 120b modulated with a quadrature 14 kHz resonant frequency signal. In other words, as before diametrically opposed electrodes are provided with common-phase resonant frequency signals but anti-phase PWM drive signals.

It will be appreciated that a single charge amplifier 44 is common to each of FIGS. 4 to 7. Since the sensing signal 70 carries both accelerometer and gyroscope data, the same charge amplifier 44 can be used for all of the sensing and drive arrangements described hereinabove. All four pairs of electrodes around the ring structure 3 can be used for primary and secondary drives.

Figure 8:
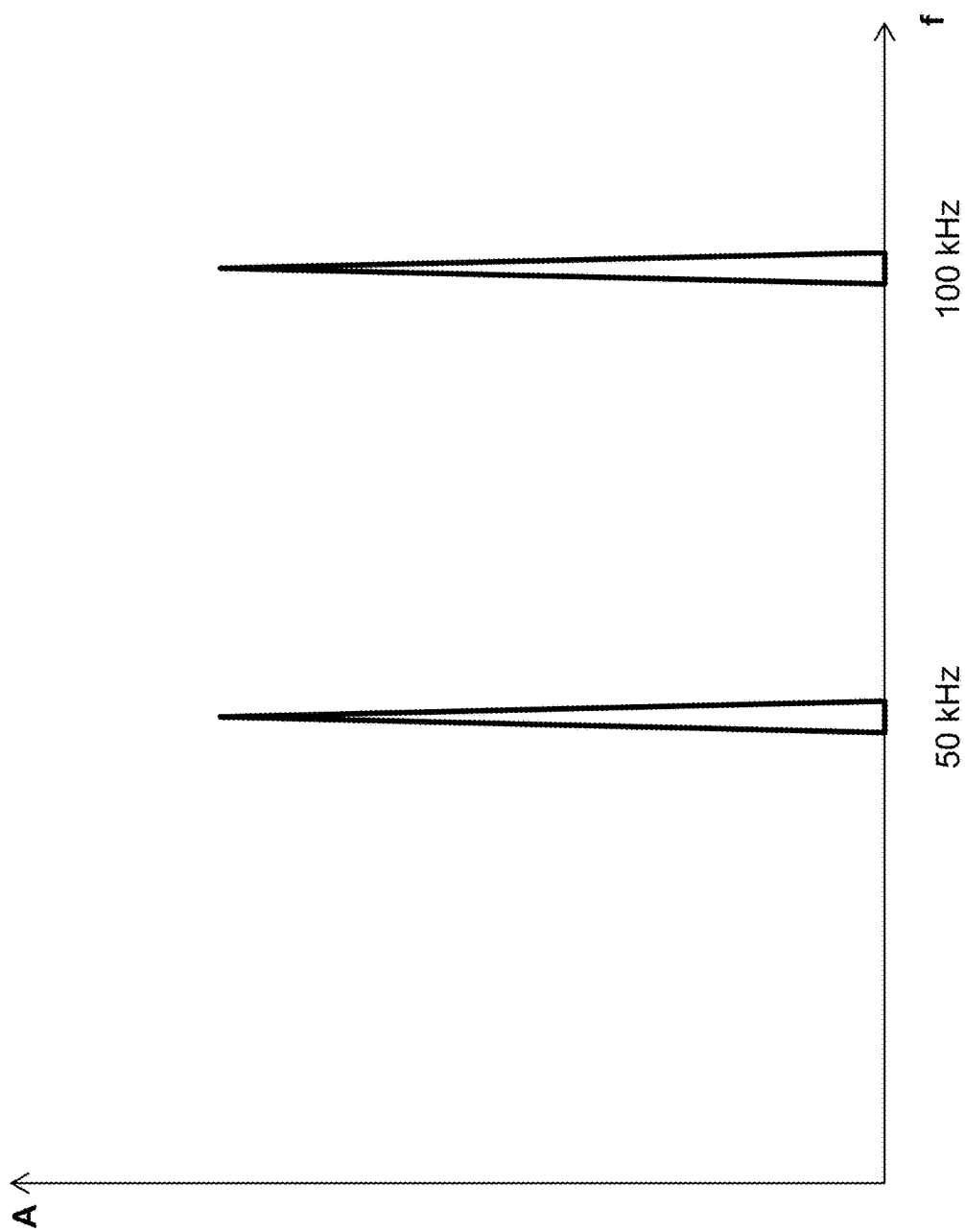
FIG. 8 shows a graph illustrating the frequency components of the pick-off signal.

FIG. 8 shows a graph illustrating the frequency components of the primary pick-off signal. When the sensing signal 70 is picked off from the ring structure 3, both primary accelerometer and gyroscope data are modulated onto a single 50 kHz signal component and both secondary accelerometer and gyroscope data are modulated onto a single 100 kHz signal component.

Figure 9:
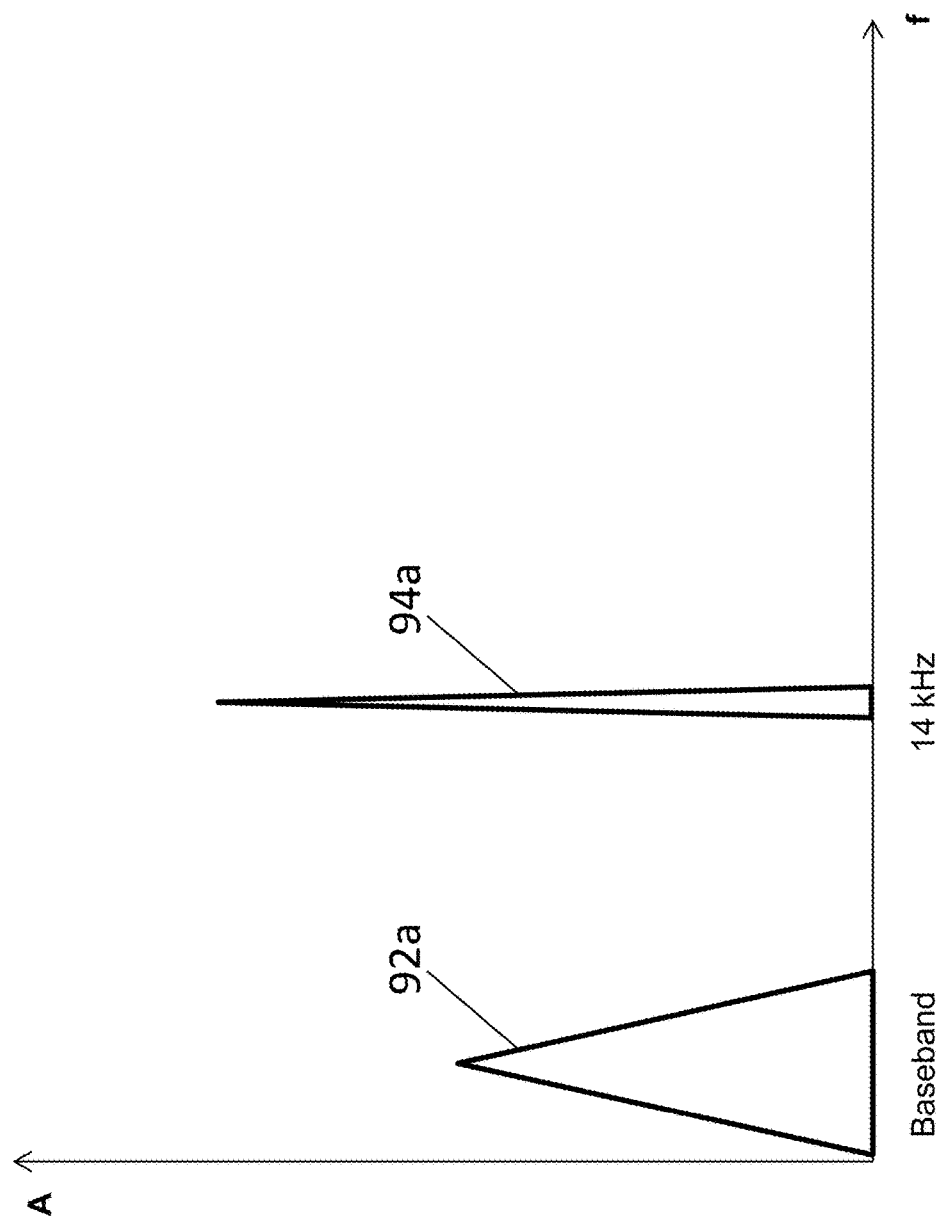
FIG. 9 shows a graph illustrating the frequency components of the pick-off signal after demodulation at the first PWM frequency.

FIG. 9 shows a graph illustrating the frequency components of the pick-off signal after demodulation at the first PWM frequency. Here, the primary accelerometer data 92a and primary gyroscope data 94a have been separated in frequency following the demodulation described hereinabove. The primary accelerometer data 92a corresponding to linear accelerations in the first sensing direction 12 exists at baseband—for example between 0 and 200 Hz, and the amplitude provides a measure of linear acceleration when the accelerometer function is operated in open-loop (i.e. with constant 50:50 mark:space ratio). In closed loop the amplitude A of this baseband component will be nullified and the linear acceleration is calculated from the mark:space ratio required to maintain the ring structure 3 in its null position. The primary gyroscope data 94a corresponding to angular rate exists at 14 kHz and thus can be readily isolated from the baseband primary accelerometer data 92a as described hereinabove.

Figure 10:
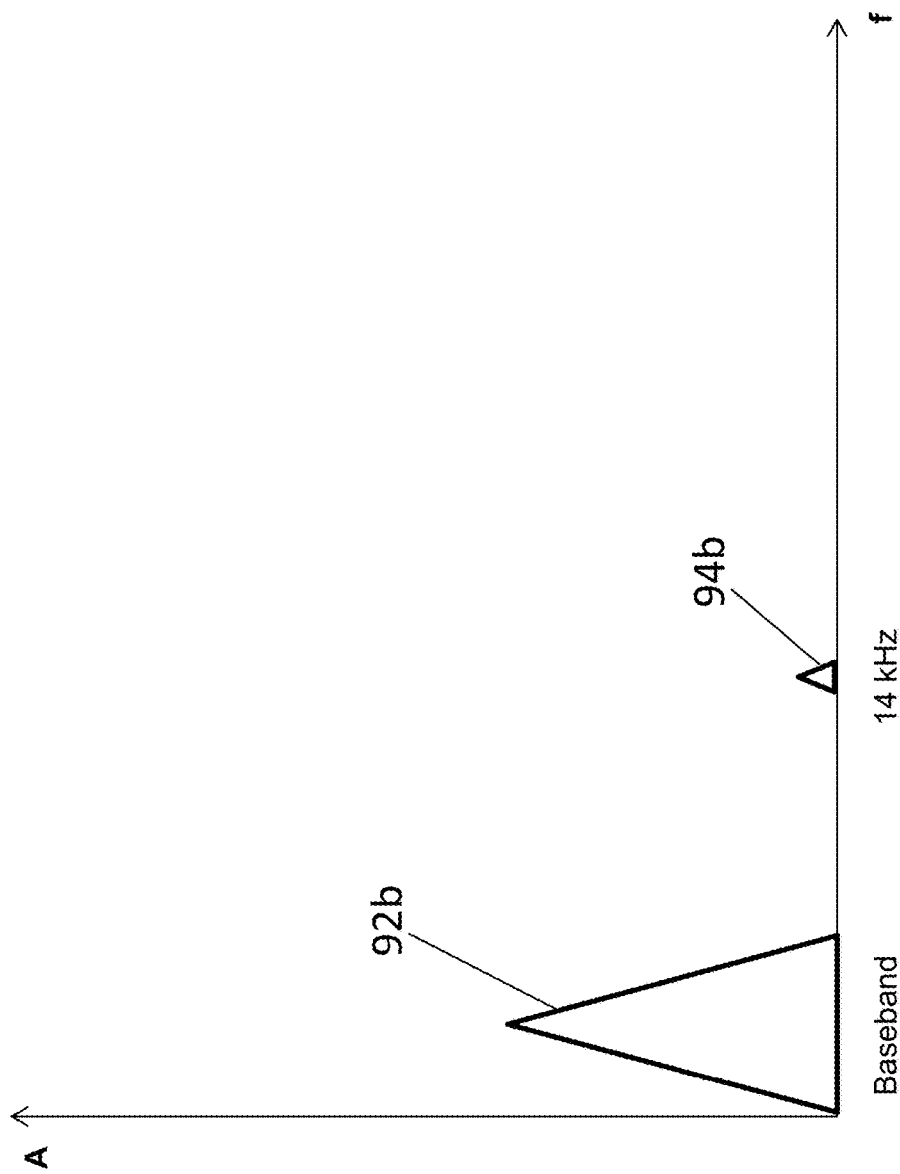
FIG. 10 shows a graph illustrating the frequency components of the secondary pick-off signal after demodulation at the second PWM frequency.

FIG. 10 shows a graph illustrating the frequency components of the secondary pick-off signal after demodulation at the second PWM frequency. As before, the secondary accelerometer data 92b and secondary gyroscope data 94b have been separated by frequency following the demodulation described hereinabove. The secondary accelerometer data 92b corresponding to linear accelerations in the second sensing direction 14 exists at baseband, and the amplitude provides a measure of linear acceleration when the accelerometer function is operated in open loop (i.e. with constant 50:50 mark:space ratio). As with the primary accelerometer data 92a, the amplitude A of this baseband component will be nullified in close-loop operation and the mark:space ratio required to nullify the motion is then a measure of linear acceleration. The secondary gyroscope data 94b corresponding to angular rate exists at 14 kHz but is nullified in order to suppress motion in the secondary mode S.

One of the benefits of the PWM drive signals disclosed herein is that the electrostatic restoring forces are linear with mark:space ratio, which gives rise to a linear accelerometer and gyroscope drive scheme. Of course it is also a benefit of the PWM drive signals that the same vibrating ring structure can provide both accelerometer and gyroscope functionality.

By setting one of the first and second frequencies to be an integer multiple of the other (i.e. by making it such that the two frequencies harmonically related to one another) makes the signal processing simpler, though it is not necessary. However, both of these frequencies must be at least twice the resonant frequency used, in practice, in order to prevent aliasing when the signals are demodulated.

Furthermore, since all drive signals are AC and there is no need to apply a DC bias voltage to the vibrating ring structure 3, unlike a conventional gyroscope measuring angular rate alone, the inertial sensor 2 as described hereinabove does not suffer long-term scale factor and bias drift issues that are prevalent among conventional vibrating ring-based gyroscopes (which utilise DC bias voltages). As mentioned above, the use of PWM drive signals is particularly advantageous as they are intrinsically linear.

Thus it will be seen that a vibrating ring-based inertial sensor that has combined accelerometer and gyroscope functionality, and that does not suffer from charge trapping effects, has been described herein. Although particular examples have been described in detail, it will be appreciated by those skilled in the art that many variations and modifications are possible using the principles of the disclosure set out herein.

The invention claimed is:

1. An inertial sensor comprising:
a substantially planar, rotationally symmetric proof mass mounted to a fixed substrate by a plurality of flexible support legs so as to be laterally moveable in a first in-plane sensing direction in response to an applied linear acceleration in said first sensing direction and to be laterally moveable in a second in-plane sensing direction in response to an applied linear acceleration in said second sensing direction, said second sensing direction being offset from the first sensing direction by a non-zero acute angle;
four pairs of electrodes arranged around the proof mass such that each electrode within a pair is diametrically opposite the other electrode in said pair, wherein a first pair of electrodes is substantially aligned with the first sensing direction, a second pair of electrodes is substantially aligned with the second sensing direction, a third pair of electrodes is substantially aligned perpendicular to the first pair of electrodes and a fourth pair of electrodes is substantially aligned perpendicular to the second pair of electrodes;
a capacitive pick-off circuit connected to the proof mass, the pick-off circuit being arranged to provide a sensing signal dependent on any applied linear acceleration and/or angular rate; and
an electrical drive circuit connected to the four pairs of electrodes, wherein the drive circuit is arranged to:
apply first in-phase and anti-phase pulse width modulation (PWM) drive signals with a first frequency to the first and third electrode pairs, such that one electrode in each pair is provided with in-phase PWM drive signals and the other electrode in each pair is provided with anti-phase PWM drive signals; and
apply second in-phase and anti-phase PWM drive signals with a second frequency, different to the first frequency, to the second and fourth electrode pairs, such that one electrode in each pair is provided with in-phase PWM drive signals and the other electrode in each pair is provided with anti-phase PWM drive signals;
wherein the first and second in-phase and anti-phase PWM drive signals are modulated such that the drive signals applied to the first and second electrode pairs are modulated with an in-phase resonance signal at a resonant frequency of the proof mass and the third and fourth electrode pairs are modulated with a quadrature resonance signal at the resonant frequency of the proof mass such that the in-phase and quadrature resonance signals cause the proof mass to oscillate in-plane in a cos 2θ mode of vibration.

2. The inertial sensor as claimed in claim 1, wherein the pick-off and/or drive circuit is further arranged to:
demodulate the sensing signal at the first frequency to obtain a first linear acceleration signal and/or an angular rate signal;
demodulate the sensing signal at the second frequency to obtain a second linear acceleration signal and/or an angular rate signal; and
determine from the first and second linear acceleration signals a linear acceleration in the first sensing direction; determine from the first and second linear acceleration signals a linear acceleration in the second sensing direction; and/or determine from the angular rate signal(s) an in-plane angular rate.

3. The inertial sensor as claimed in claim 1, wherein the capacitive pick-off circuit comprises a capacitive pick-off input and a charge amplifier arranged to integrate an input current from the capacitive pick-off input and provide the sensing signal, said sensing signal having a voltage proportional to the integrated input current.

4. The inertial sensor as claimed in claim 1, wherein the pick-off circuit comprises a first demodulation circuit arranged to demodulate the sensing signal at the first frequency and a second demodulation circuit arranged to demodulate the sensing signal at the second frequency.

5. The inertial sensor as claimed in claim 1, wherein the pick-off circuit further comprises a resonant frequency demodulation circuit arranged to further demodulate the sensing signal at the resonant frequency to obtain an angular rate signal.

6. The inertial sensor as claimed in claim 1, wherein the pick-off circuit comprises an accelerometer loop filter.

7. The inertial sensor as claimed in claim 1, wherein the pick-off circuit comprises a bandpass filter arranged to substantially reject signals with a frequency substantially different to the resonant frequency or a high-pass filter arranged to substantially reject signals substantially below the resonant frequency.

8. The inertial sensor as claimed in claim 1, wherein the drive circuit is arranged to vary the mark:space ratios of the first and second PWM drive signals so that linear mechanical inertial forces resulting from applied linear accelerations in the first and second sensing directions are balanced by electrostatic restoring forces to maintain the operating point of the proof mass at a null position.

9. The inertial sensor as claimed in claim 1, wherein the drive circuit is arranged to modulate a PWM drive signal with a resonance signal by varying the mark:space ratio of said PWM drive signal between a first mark:space ratio value and a second mark:space ratio value at the frequency of the resonance signal.

10. The inertial sensor as claimed in claim 1, wherein the drive circuit comprises a phase locked loop circuit arranged to drive a voltage controlled oscillator at the resonant frequency, the voltage controlled oscillator being arranged to provide the resonance signal that is modulated onto the drive signals.

11. The inertial sensor as claimed in claim 1, wherein the drive circuit comprises an in-phase modulation circuit arranged to modulate the second in-phase and anti-phase PWM signals with the in-phase resonance signal and a quadrature modulation circuit arranged to modulate the second in-phase and anti-phase PWM signals with the in-quadrature resonance signal in order to nullify any oscillation of the proof mass in a secondary mode of vibration.

12. A method of operating an inertial sensor comprising:

a substantially planar, rotationally symmetric proof mass mounted to a fixed substrate by a plurality of flexible support legs so as to be laterally moveable in a first in-plane sensing direction in response to an applied linear acceleration in said first sensing direction and to be laterally moveable in a second in-plane sensing direction in response to an applied linear acceleration in said second sensing direction, said second sensing direction being offset from the first sensing direction by a non-zero acute angle; and four pairs of electrodes arranged around the proof mass such that each electrode within a pair is diametrically opposite the other electrode in said pair, wherein a first pair of electrodes is substantially aligned with the first sensing direction, a second pair of electrodes is substantially aligned with the second sensing direction, a third pair of electrodes is substantially aligned perpendicular to the first pair of electrodes and a fourth pair of electrodes is substantially aligned perpendicular to the second pair of electrodes;

the method comprising:

connecting a capacitive pick-off circuit to the proof mass to provide a sensing signal dependent on any applied linear acceleration and/or angular rate;

applying first in-phase and anti-phase pulse width modulation (PWM) drive signals with a first frequency to the first and third electrode pairs, such that one electrode in each pair is provided with in-phase PWM drive signals and the other electrode in each pair is provided with anti-phase PWM drive signals; and applying second in-phase and anti-phase PWM drive signals with a second frequency, different to the first frequency, to the second and fourth electrode pairs, such that one electrode in each pair is provided with in-phase PWM drive signals and the other electrode in each pair is provided with anti-phase PWM drive signals;

wherein the first and second in-phase and anti-phase PWM drive signals are modulated such that the drive signals applied to the first and second electrode pairs are modulated with an in-phase resonance signal at a resonant frequency of the proof mass and the third and fourth electrode pairs are modulated with a quadrature resonance signal at the resonant frequency of the proof mass such that the in-phase and quadrature resonance signals cause the proof mass to oscillate in-plane in a cos 2θ mode of vibration.

13. The method of claim 12, further comprising:

demodulating the sensing signal at the first frequency to obtain a first linear acceleration signal and/or an angular rate signal;

demodulating the sensing signal at the second frequency to obtain a second linear acceleration signal and/or an angular rate signal; and determining from the first and second linear acceleration signals: a linear acceleration in the first sensing direction; determining from the first and second linear acceleration signals a linear acceleration in the second sensing direction; and/or determining from the angular rate signal(s) an in-plane angular rate.

14. The method of claim 13, further comprising varying the mark:space ratios of the first and second drive signals so that linear mechanical inertial forces resulting from applied linear accelerations in the first and second sensing directions are balanced by electrostatic restoring forces to maintain the operating point of the proof mass at a null position.

15. The method of claim 12, wherein modulating a PWM drive signal with a resonance signal comprises varying the mark:space ratio of said PWM drive signal between a first mark:space ratio value and a second mark:space ratio value at the frequency of the resonance signal.

* * * * *